United States Patent [19]

Patterson

[11] 3,779,589

[45] Dec. 18, 1973

[54] FLEXIBLE STRAP-TYPE SEAL HAVING ENCLOSED LOCKING MEANS

[75] Inventor: Richard A. Patterson, St. Paul, Minn.

[73] Assignee: The United Seal Company, Columbus, Ohio

[22] Filed: Mar. 24, 1972

[21] Appl. No.: 237,844

[52] U.S. Cl. .................................................. 292/317
[51] Int. Cl. .................................................. B65d 55/06
[58] Field of Search ..............................292/317–322

[56] References Cited

UNITED STATES PATENTS

| | | | |
|---|---|---|---|
| 1,558,960 | 10/1925 | Brune | 292/317 |
| 3,157,421 | 11/1964 | Nierhaus | 292/319 |
| 1,338,618 | 4/1920 | Ford | 292/317 |
| 1,482,672 | 2/1924 | Brooks | 292/317 |
| 954,271 | 4/1910 | Edgar | 292/320 |
| 3,149,869 | 9/1964 | Chamberlain | 292/320 |
| 2,821,424 | 12/1958 | Brooks | 292/317 |

*Primary Examiner*—Marvin A. Champion
*Assistant Examiner*—William F. Pate, III
*Attorney*—William S. Rambo

[57] ABSTRACT

A closed-loop security seal for detecting unauthorized opening of the closure means of a freight car, meter casing, or the like, which embodies a flexible plastic strap formed at its opposite ends with relatively engageable catch and latch portions for locking insertion within a cooperatively channeled keeper, the strap being further formed with tamper deterring shoulders arranged to conformingly cover the ends of the keeper upon locking insertion of the catch and latch portions of the strap within the keeper.

1 Claim, 8 Drawing Figures

10 12 24 25 20 17 14 11 13 15 19

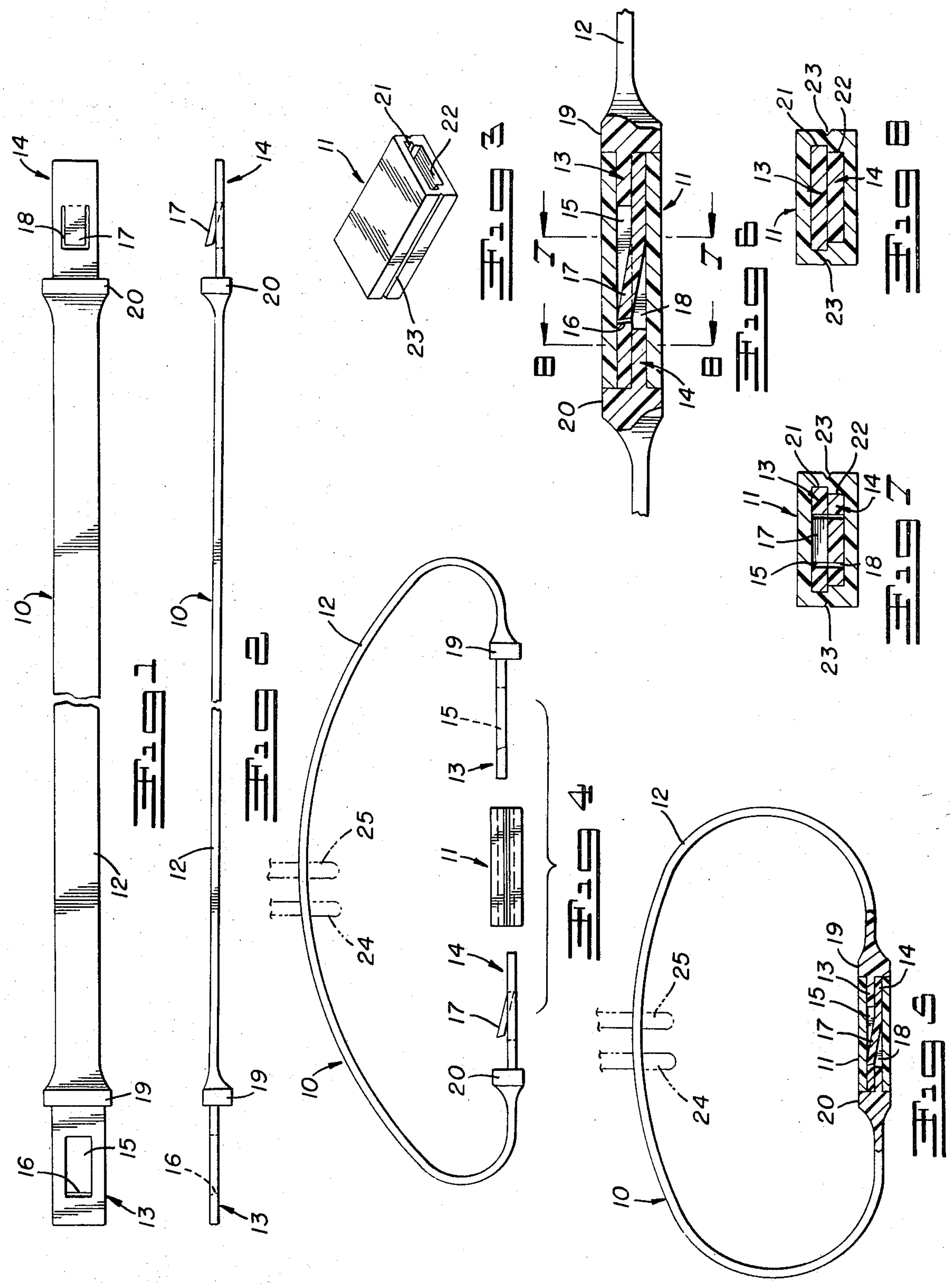

FLEXIBLE STRAP-TYPE SEAL HAVING ENCLOSED LOCKING MEANS

BACKGROUND OF THE INVENTION

The present invention relates generally to security seals intended to indicate unauthorized opening or tampering with the closure door or panel of a freight car, meter casing, or similar enclosure. More particularly, the invention relates to an improved tamper deterring seal composed entirely of plastic or synthetic resin material.

In the past, freight car and meter seals have generally comprised an elongated, flexible metal strap or wire adapted to be looped through a pair of eye members or bails associated with the openable door or closure panel of the freight car or meter casing, and a seal body adapted to interlock or connect the ends of the applied strap or wire in a manner to preclude separation thereof without detection. In certain instances, the seal body was composed of a relatively soft metal, such as lead, which was deformed, swaged, or molded about the ends of the strap or wire member by means of a hand tool, so as to seal and lock the ends of the strap or wire against undetectable separation. In other seal constructions, the seal body consisted of a socketed keeper into which the ends of the strap or wire member were inserted and automatically locked against accidental separation or withdrawal.

However, such prior art seals have been subject to numerous objections stemming principally from their difficulty of application or installation and/or their relatively high cost of manufacture.

SUMMARY AND OBJECTS OF THE INVENTION

This invention provides an improved security seal formed entirely from plastic or synthetic resin materials and consisting of an elongated, flexible strap or filament formed at the opposite ends thereof with relatively interlocking latch and catch portions arranged to be brought together and held in locked engagement within a tubular or channeled keeper member. The strap element of the seal is formed adjacent the latch and catch portions thereof with relatively enlarged shoulders which are arranged to cover and close with ends of the keeper member upon insertion of the latch and catch portions of the strap within the keeper to thus prevent undetected tampering with or release of the interlocking catch and latch portions of the seal.

The principal object of this invention is to provide a comparatively inexpensive, yet mechanically efficient, car or meter seal of all plastic composition.

Another object of the invention is to provide a seal capable of rapid, foolproof assembly.

Another object is to provide a seal which may be secured by a simple manual operation without the need of specialized tools.

Further objects and advantages of the invention will be apparent from the following specification and claims.

BRIEF DESCRIPTION OF THE DRAWINGS

FIG. 1 is a top plan view of the flexible strap member of a seal according to this invention;

FIG. 2 is a side elevational view of the strap member illustrated in FIG. 1;

FIG. 3 is a perspective view of the keeper member of the seal;

FIG. 4 is an elevational view of the seal preparatory to insertion of the latch and catch end portions of the strap into the keeper member;

FIG. 5 is a side elevational view, partly in vertical section, showing the ends of the strap member in interlocked engagement in the keeper member;

FIG. 6 is an enlarged, fragmentary vertical sectional view taken through the keeper member and the interlocked latch and catch portions of the seal;

FIG. 7 is a transverse vertical sectional view taken substantially along the line 7—7 of FIG. 6; and FIG. 8 is a similar view taken substantially along the line 8—8 of FIG. 6.

DETAILED DESCRIPTION OF PREFERRED EMBODIMENT

By reference to the accompanying drawing, it will be seen that the seal of this invention comprises an elongated, flexible filament or strap member 10 and a tubular or channelled keeper member 11. The strap member 10 is preferably molded or otherwise formed from a resiliently flexible synthetic resin, such as polypropylene or polyethylene, and the keeper member is preferably formed by extrusion from a substantially rigid synthetic resin, such as a polyamide, or polystyrene resin. The strap member 10 is formed with a relatively thin, flexible, intermediate body portion 12 which terminates at one end thereof in a slotted catch portion 13. The opposite end of the strap member is formed with a latch portion 14. The catch portion 13 is formed with a generally rectangular slot 15 which is defined at one end thereof by a beveled end wall or catch 16. The latch portion 14 at the opposite end of the strap member 10 is formed with a vertically displaced, resiliently flexible barb-like tang or dog 17 which is disposed in acute angular relation to the flat body portion of the latch portion 14. Advantageously, the locking tang or dog 17 is struck or pressed outwardly from the central part of the latch portion 14 so as to provide a slot 18 adjacent thereto. The outer end of the dog 17 is also preferably beveled at substantially the same angle as the end wall 16 of the catch portion 13. As will be noted particularly in FIGS. 1, 7 and 8, the width of the catch portion 13 of the strap member 10 is somewhat greater than the width of the latch portion 14 for a purpose which will be hereinafter explained. The strap member 10 is further formed adjacent the catch portion 13 and latch portion 14 thereof with a pair of relatively enlarged rectangular bosses or shoulders 19 and 20.

The keeper member 11 of the seal consists of a hollow, generally flat, rectangular body having substantially the same height and width dimensions as the shoulders 19 and 20. The keeper member is formed with a through passage which includes a pair of vertically adjoining channels or recesses 21 and 22 whose dimensions conform closely to the dimensions of the catch and latch portions 13 and 14 of the strap member 10. Advantageously, the outer side walls of the keeper member 11 are formed with wall-weakening recesses or grooves 23 which define breakage or severance lines along each wall of the keeper member.

In operation, the present security seal is assembled by first passing one of the catch or latch end portions of the strap member through the aligned openings of a pair of adjacent bails or eye members, indicated by broken lines at 24 and 25 (FIGS. 4 and 5). It will be understood that the bails or eye members 24 and 25 are those normally associated with the door or closure member of the freight car or meter casing which is to be sealed in a closed position by the seal of this invention. As such, the eye members 24 and 25 form no part of the present seal structure. With the intermediate body portion 12 of the strap member 10 looped through the eye members 24 and 25, the seal is locked or "sealed" simply by inserting the catch and latch portions 13 and 14 of the strap member into the opposite ends of the channels 21 and 22 of the keeper member 11. As will be noted particularly by reference to FIG. 6 of the drawing, the locking dog or tang 17 of the latch portion 14 of the strap member is so arranged as to project into the slot 15 and lockingly engage with the beveled end wall 16 of the catch portion 13 upon full insertion of the latch and catch portion of the strap member into the width conforming channels or recesses 21 and 22 of the keeper member 11. As previously indicated, the locking dog or tang 17 is resiliently flexible, and as the latch and catch portions are moved into relatively overlapped or superposed relation within the keeper 11, the dog or tang 17 is initially cammed or flexed downwardly into the adjacent slot 18 formed in the latch portion 14 until the slot 15 is brought into registery with the tang 17, at which time it snaps upwardly into locking position in the slot 15, as shown in FIGS. 5 and 6. Any attempt to separate the interlocked catch and latch portions by tensile forces applied to the ends of the strap member will be defeated by reason of the engagement of the end of the tang 17 with the cooperatively beveled end wall 16 of the catch portion 13.

The relatively enlarged shoulders 19 and 20 are so arranged on the strap member 10 as to substantially engage and thereby effectively close the ends of the keeper member 11 when the catch and latch portions 13 and 14 are fully inserted in the respective channels 21 and 22 of the keeper member 11. The abutting, flush relationship of the shoulders 19 and 20 with the ends of the keeper effectively prevents the insertion of a blade or similar device into the channels of the keeper member for the purpose of releasing the interlocked catch and latch portions.

Another important feature of the present seal resides in the different widths of the catch and latch portions 13 and 14 and the channels 21 and 22 of the keeper member 11. This differential in widths prevents inadvertent insertion of the wider catch portion 13 of the strap into the narrower channel 22 of the keeper member and thereby "foolproofs" the seal against inversion or improper overlapping of the catch and latch portions 13 and 14 when they are inserted in the keeper member.

If desired for the purpose of additionally simplifying the assembly or locking oepration, the keeper member 11 may be adhesively bonded to either the catch portion 13, or the latch portion 14 of the strap member at the factory or at any time prior to the field installation of the seal to thereby provide a unitized assembly at the time of sealing or final assembly.

The wall-weaking recesses or grooves 23 formed in the outer side walls of the keeper member 11 are for the purpose of facilitating the authorized breaking or destruction of the seal after it has served its sealing function. Authorized breakage of the seal may be easily effected simply by forcibly yanking or pulling on the closed strap member with sufficient force to fracture the keeper member along the plane of the recesses or grooves 23.

In view of the foregoing, it will be seen that the present invention provides a mechanically efficient, easily fastened, snap-lock security seal for freight cars, meter casings and the like which is formed entirely from relatively inexpensive plastic or synthetic resin components.

While a single preferred embodiment of the invention has been illustrated and described in detail, it will be understood that various modifications in design and details of construction are possible without departing from the spirit of the invention or the scope of the following claims.

I claim:

1. A security seal for indicating the unauthorized opening of a closure comprising:

an elongated, flexible strap of synthetic resin composition formed at one end thereof with an integral, slotted catch portion and at its opposite end with an integral latch portion including a barb-like, resiliently retractable tang, said catch and latch portions being generally rectangular in formation, but having different widths, said strap being formed adjacent to and inwardly from each of the catch and latch portions thereof with relatively enlarged shoulders; and a keeper member formed with a passage defined by a pair of adjoining but axially offset channels each extending through said keeper member and being of different widths corresponding to the widths of and arranged to receive the catch and latch portions, respectively, of said strap through the opposite ends of said passage and to hold the catch and latch portions in relatively overlapped interlocked engagement therein, the relatively enlarged shoulders of said strap being arranged to completely close the opposite ends of the passage of said keeper upon full insertion of the catch and latch portions therein.

* * * * *